(12) United States Patent
Holmberg

(10) Patent No.: US 10,951,812 B2
(45) Date of Patent: Mar. 16, 2021

(54) DEPTH TRIGGERED AUTO RECORD

(71) Applicant: Paralenz Group ApS, Copenhagen K (DK)

(72) Inventor: Martin Holmberg, Allerød (DK)

(73) Assignee: Paralenz Group ApS, Copenhagen (DK)

( * ) Notice: Subject to any disclaimer, the term of this patent is extended or adjusted under 35 U.S.C. 154(b) by 42 days.

(21) Appl. No.: 16/363,921

(22) Filed: Mar. 25, 2019

(65) Prior Publication Data

US 2019/0306400 A1    Oct. 3, 2019

Related U.S. Application Data

(60) Provisional application No. 62/649,419, filed on Mar. 28, 2018.

(51) Int. Cl.
*H04N 5/232* (2006.01)
*G03B 17/08* (2021.01)

(52) U.S. Cl.
CPC ......... *H04N 5/23222* (2013.01); *G03B 17/08* (2013.01); *H04N 5/23203* (2013.01)

(58) Field of Classification Search
CPC . H04N 5/23203; H04N 5/23222; G03B 17/08
USPC ........................................................ 348/81
See application file for complete search history.

(56) References Cited

U.S. PATENT DOCUMENTS

| | | | | |
|---|---|---|---|---|
| 5,365,290 A | * | 11/1994 | Suzuki | G03B 17/08 396/26 |
| 2003/0038876 A1 | * | 2/2003 | Nagashima | H04N 7/183 348/81 |
| 2010/0235018 A1 | * | 9/2010 | Christ | B63C 11/52 701/2 |
| 2011/0074945 A1 | * | 3/2011 | Watanabe | H04N 5/232 348/81 |
| 2011/0292202 A1 | | 12/2011 | Tanaka | |
| 2012/0083945 A1 | * | 4/2012 | Oakley | B64C 25/52 701/2 |
| 2014/0071264 A1 | | 3/2014 | Seo | |
| 2017/0187957 A1 | | 6/2017 | Iwaizumi | |

FOREIGN PATENT DOCUMENTS

EP          2550559      1/2013
WO    WO 2017/198746    11/2017

* cited by examiner

*Primary Examiner* — Daniel M Pasiewicz
(74) *Attorney, Agent, or Firm* — Knobbe Martens Olson & Bear LLP

(57) ABSTRACT

The invention relates to an underwater digital video camera having an auto record system for automatically starting and stopping video recording at predetermined depths. The camera receives a current depth from a depth gauge and holds a sequence of recent currents depths and auto record settings such as a start trigger depth and a stop trigger depth, wherein the auto record system is adapted to, after the start/stop trigger depth is arrived at or passed for increasing/decreasing depths, start/stop video recording.

14 Claims, 2 Drawing Sheets

DEPTH TRIGGERED AUTO RECORD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

The present disclosure relates to an underwater digital video camera, specifically such video camera having an auto-record function that can be triggered by the camera reaching a certain depth.

BACKGROUND

Some underwater cameras are normal cameras in an underwater housing, which often makes the operation difficult since the housing buttons are mechanically connected to the buttons on the camera. Dedicated underwater cameras are also prone to difficulties since the waterproof requirement usually means fewer and less sensitive buttons.

The operation of underwater cameras is also made complicated by a large number of circumstances particular to underwater photography such as cold fingers and/or thick gloves, poor visibility, limited scope of vision due to dive mask, limited freedom of movement due to heavy equipment and dive suit, uncontrolled movement due to buoyancy issues, waves and currents, and in general an environment where the operator needs to pay attention to many factors simultaneously.

EP 2 550 559 B1 describes a digital underwater camera using a pressure sensor to automatically select an underwater photography mode. The input from the pressure sensor is used to determine if the camera is currently above or below the water surface and, if it is below, automatically selects various settings applicable to underwater photography.

SUMMARY

It is an object of the invention to provide an underwater digital video camera that automatically starts and stops video recording when the video camera reaches a certain depth.

It is another object of the invention to provide an underwater digital video camera where the user can adjust depth triggered auto-record settings.

Therefore, in a first aspect, the invention provides an underwater digital video camera having an auto record system for automatically starting and stopping video recording, a depth gauge to provide a current depth of the video camera to the auto-record system, and digital storage accessible by the auto record system for holding auto record settings and a sequence of recent currents depths from the depth gauge, wherein the auto record settings in the digital storage comprise a start trigger depth and a stop trigger depth, and wherein the auto record system is adapted to, after the start/stop trigger depth is arrived at or passed for increasing/decreasing depths, start/stop video recording.

The invention is advantageous in that it allows the user to record a video of the dive without having to manually start/stop recording. With prior art underwater video cameras, the user would typically start the recording before entering the water due to the issues mentioned earlier or have to start/stop the recording under water. In both cases, the recorded video will typically include scenes that are of little interest or undesired, such as the movement of the image and the hand close to the lens as the diver starts/stops recording. Such scenes would typically need to be removed by manual editing. The invention is thus also advantageous in that the recorded video will not include frames disturbed by the user pressing the start/stop button.

In an alternative aspect, one of the start or stop trigger depths may be deactivated so that the auto record system does not automatically start or stop recording and the diver relays on manual starting or stopping video recording when desired.

The formulation arrived at or passed a trigger depth is used since the depth gauge may not provide continuous depth data so that the exact value of the stored trigger depth may never be provided to the auto-record system. Also, it may be desired that the camera does not immediately start/stop recording upon arrival at the trigger depth since, in a preferred embodiment, the auto record settings in the digital storage further comprise a start delay and/or a stop delay (the start delay and the stop delay both being larger than zero) and the auto record system is further adapted to start/stop of video recording a time equal to the start/stop delay after the start/stop trigger depth is arrived at or passed for increasing/decreasing depths.

This is advantageous since it allows the diver to adapt the recording according to his/her individual preferences or the type of diving and to extent recording to after leaving the water.

In another embodiment, the one or more of the auto record settings can be adjusted by a user. This is advantageous, since it allows the user to adjust the recording according to his/her individual preferences or the type of diving. In depth-triggered events in diver electronics of the prior art, such as the automatic selection of an underwater photography mode in EP 2 550 559 B1 or dive/decompression computers, the trigger depth settings are fixed and cannot be adjusted by the user. For dive/decompression computers in particular, the trigger depths are not to be tampered with for reasons of safety.

In the present description, an underwater video camera is any camera suitable for recording a video underwater, including a camera placed in an underwater housing. The current depth of the video camera includes any data indicative of such depth, such as pressure data or similar. Also, the depth of the video camera is to be understood as a depth in the immediate vicinity of the video camera, as the size of the video camera itself causes it to cover a depth range and since the depth gauge may be external to the video camera.

In a further aspect, the invention provides a method, performed by an auto record system of an underwater digital video camera, for automatically starting and stopping video recording, the underwater digital video camera comprising a digital storage holding a sequence of recent currents depths and auto record settings comprising a start trigger depth and a stop trigger depth, the method comprising the following to be performed repeatedly:
  if the video camera is not recording and for increasing depths, determine whether the start trigger depth has been arrived at or passed;
  if the start trigger depth has not been arrived at or passed, then determine the current depth and add it to the sequence of recent currents depths;
  if the start trigger depth has been arrived at or passed, then start recording;

if the video camera is not recording and for decreasing depths, determine the current depth and add it to the sequence of recent currents depths;

if the video camera is recording and for decreasing depths, determine whether the stop trigger depth has been arrived at or passed;

if the stop trigger depth has not been arrived at or passed, then determine the current depth and add it to the sequence of recent currents depths;

if the stop trigger depth has been arrived at or passed, then stop recording;

if the video camera is recording and for increasing depths, determine the current depth and add it to the sequence of recent currents depths.

The gist of the invention is that the video camera can automatically start and stop recording based on the development of the dive. The user may also set the auto-record settings based on his/her preferences or type of diving.

DETAILED DESCRIPTION

Figure 1:
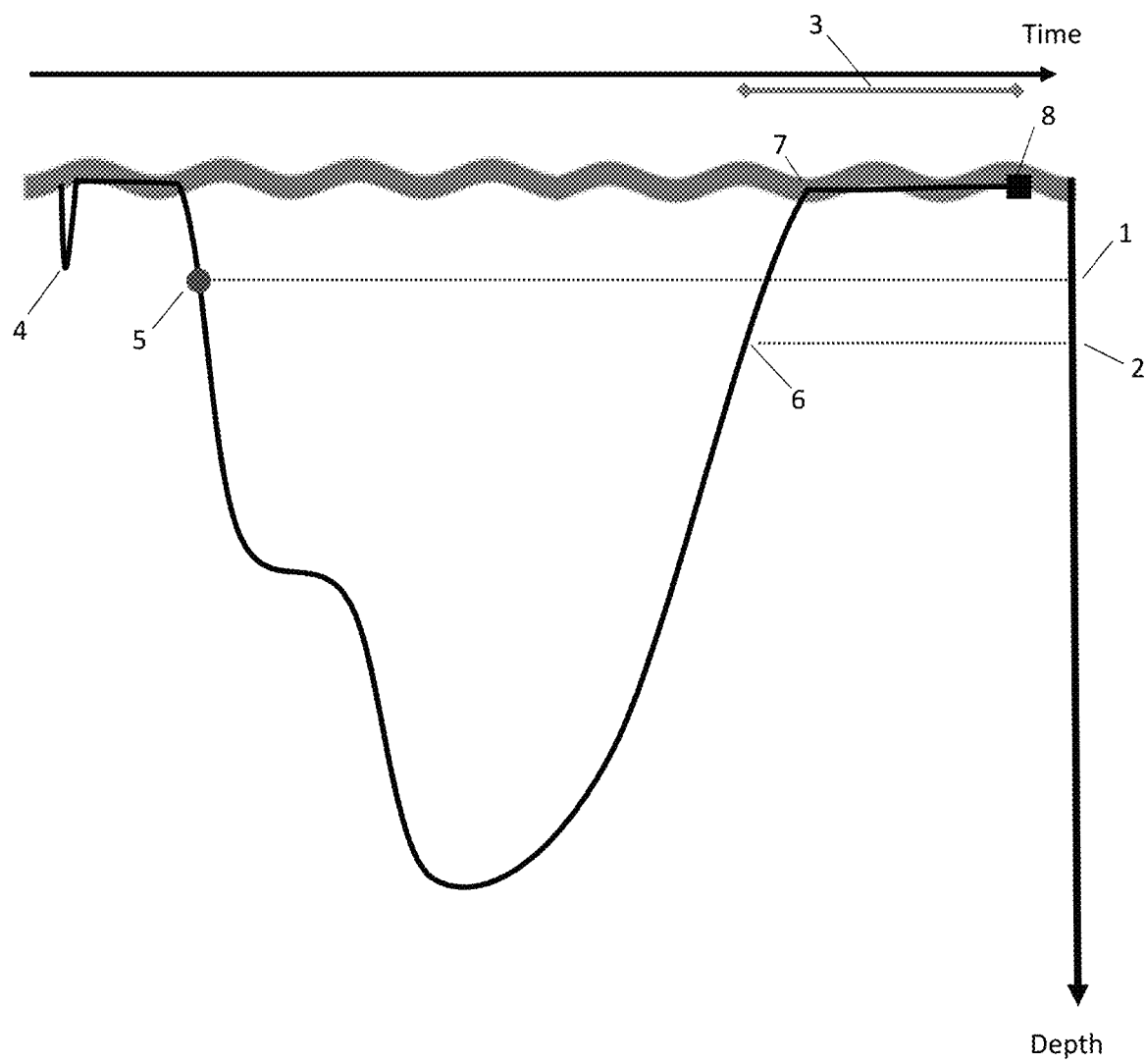
FIG. 1 illustrates a time-depth development of a dive with indication of auto-record settings.

FIG. 1 illustrates a time-depth development of a dive, with the auto record settings start trigger depth 1, stop trigger depth 2 and stop delay 3 shown (start delay=0 is not shown). At 4, the diver enters the water and is shortly under water before returning to the surface as mentioned above. At 5, the diver arrives at or passes the start trigger depth 1 and the auto-record system initiates video recording. At 6, the diver arrives at or passes the stop trigger depth 2 and the auto-record system triggers the countdown of the stop delay 3. At 7 the diver breaks the surface to finish the dive, and the auto-record system awaits expiry of the stop delay 3 before stopping video recording at 8.

The stop delay is relevant for example in recreational diving when the user desires to also catch the moment when of breaking the surface and the excitement during the first exchanges of the highlights between dive buddies. For underwater hunting it is often desirable to have the chance to inspect a potential catch after arriving at the surface.

In all sorts of diving, with the exception of military diving, it is good practice to return to the surface after entering the water, to check and brief with dive buddies and assistance on land/boat. Therefore, even though a diver wants the camera to start recording at shallow depths, it may not be desirable that the camera starts recording immediately since the first arrival at this shallow depth is when jumping in the water. So, in order not to create a 1-2 seconds video clip of the last part of the jump (arrived at start trigger depth) and the return to surface (arrived at stop trigger depth), the recording start can also be delayed a fixed amount of time, the start delay.

Figure 2:
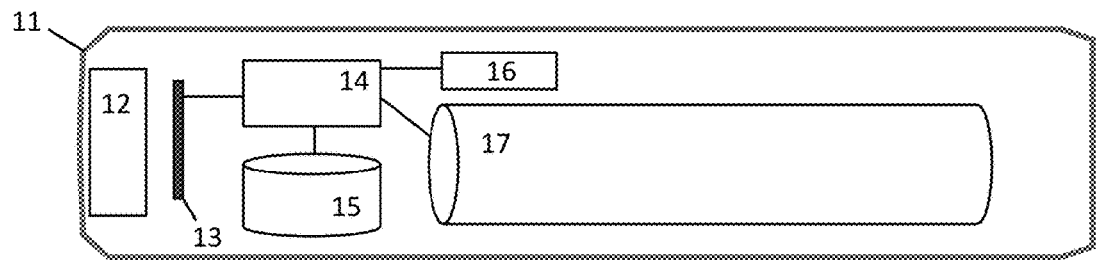
FIG. 2 illustrates a video camera according to an embodiment of the invention.

FIG. 2 illustrates a video camera 11 having imaging optics 12, a digital image sensor 13, a processor 14, memory 15, a depth gauge 16 to provide a current depth of the video camera to the control system and a battery 17. The auto-record system is provided by the processor in the form of an ASIC or software to be executed by the processor. The auto-record system will typically be part of a larger system for operating the video camera. The auto-record settings are parameters such as the start/stop trigger depth and the start/stop delay used by the auto-record system and which are stored in the memory 15.

In one embodiment, the auto-record system has preset auto-record profiles, i.e. a set of auto-record settings, adapted for individual users or types of diving. It is preferred that the auto-record system involves a user interface where the user can adjust the individual auto-record settings or chose an auto-record profile.

Figure 3:
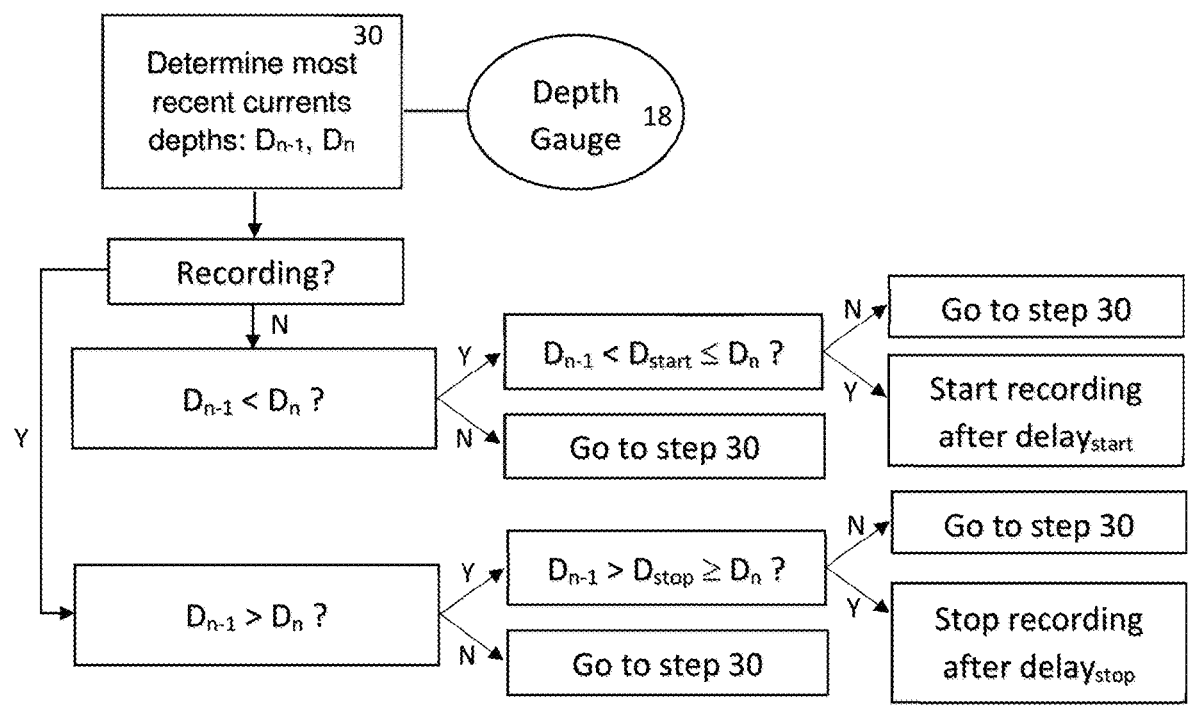
FIG. 3 is a flow chart illustrating an architecture of software for an implementation of the invention.

FIG. 3 is a flowchart illustrating the architecture of the software or ASIC of the auto-record system in accordance with an embodiment of the invention. It is noted that there are many different possible architectures that can all implement the invention, and that the embodiment of FIG. 3 is just one example.

In the embodiment of FIG. 3, the auto-record system receives a depth or depth-related pressure data from an electric depth gauge 18 and determines (30) a current depth $D_n$ of the video camera as well as the last determined depth $D_{n-1}$. If the camera is not recording, the auto-record system proceeds to figure out if it should start recording. First, it determines whether the depth is currently increasing, and if, whether the start trigger depth $D_{start}$ has been arrived at or passed with the arrival at $D_n$, and if, start recording after a time equal to the start delay, $delay_{start}$. If $delay_{start}=0$ it will start recording immediately.

If the depth is not increasing, auto-record system returns to step 30.

If the start trigger depth $D_{start}$ has not been arrived at or passed with the arrival at $D_n$, then the user is either at a shallower depth or has passed $D_{start}$ previously and has manually turned off recording in the meantime. The auto-record system returns to step 30 and will monitor whether the diver arrives at or passes $D_{start}$ (again) for increasing depths.

If the camera is recording, the auto-record system proceeds to figure out if it should stop recording. The process is equivalent to the process for recording start described above.

The auto-record settings $D_{start}$, $D_{stop}$, $delay_{start}$ and $delay_{stop}$ are all stored in the memory 15 and retrieved by the auto-record system when needed.

The depth gauge 16 to provide a current depth of the video camera 1 to the auto-record system may be an electric depth gauge 18 comprised by the video camera or a communication link to an external electric depth gauge 18 positioned close to the video camera and being in communication with the camera, such as via a wired or wireless communication link. Such external depth gauge would measure the depth of the depth gauge and not of the video camera and should therefore be close to the video camera, typically carried by the user of the video camera, so that it would measure the depth of the video camera +/−max. 0.5 meter. In the present description, the depth measured by such close, external depth gauge is also referred to as the depth of the video camera.

A depth gauge is most commonly a pressure sensor measuring a pressure of the water surrounding the sensor. Other types of depth gauges exist and may be used in the invention. For a pressure sensor, the pressure P as a function of depth in the is given by:

$$P=P_0+\rho g d_G$$

where $P_0$ is the air pressure at the upper surface of the water, $\rho$ is the water density (~1000 kg/m3), g is the acceleration due to gravity (~9.8 m/s2) and $d_G$ is the depth of the depth gauge. Preferably, the pressure sensor is calibrated to return the "gauge pressure" $P_G=P-P_0$, which is the pressure difference relative to the air pressure. The gauge pressure can be used to determine the depth of the depth gauge:

$$d_G=P_G/\rho g.$$

The depth gauge will typically transmit depth data at short intervals so that a sequence of depths $D_{n-1}$, $D_n$, $D_{n+1}$ is steadily received by the auto-record system.

The auto-record system can involve an override functionality. If for example the user manually activates a start/stop recording button on the camera before, during, or after the recording period decided by the auto-record settings, this may override or even cancel the auto-record. Alternatively, it will only lead to the user prematurely starting or stopping recording for that specific dive.

The invention is in particular relevant for activities involving a large number of short consecutive dives, such as snorkeling and in particular spear fishing. There is often a lot of waiting time between dives that is of little interest and starting and stopping recording at each dive is cumbersome.

Other areas are dive situations with a high requirement of documentation, where video recording is default and where the diver's attention to other tasks is essential. This refers to underwater archeology, military operations or search & rescue operations in particular, as well as educational and industrial diving in general.

What is claimed is:

1. An underwater digital video camera having an auto record system for automatically starting and stopping video recording, a depth gauge to provide a current depth of the video camera to the auto-record system, and digital storage accessible by the auto record system for holding auto record settings and a sequence of recent currents depths from the depth gauge, wherein the auto record settings in the digital storage comprise:
    a start trigger depth; and
    a stop trigger depth;
    wherein the auto record system is configured to:
        after the start trigger depth is arrived at or passed while the current depth is increasing, start video recording; and
        after the stop trigger depth is arrived at or passed while the current depth is decreasing, stop video recording.

2. The underwater digital video camera according to claim 1, wherein the auto record settings in the digital storage further comprise a stop delay, and wherein the auto record system is adapted to stop of video recording a time equal to the stop delay after the stop trigger depth is arrived at or passed for decreasing depths.

3. The underwater digital video camera according to claim 1, wherein the auto record settings in the digital storage further comprise a start delay, and wherein the auto record system is adapted to start of video recording a time equal to the start delay after the start/stop trigger depth is arrived at or passed for increasing depths.

4. The underwater digital video camera according to claim 1, wherein one or more of the auto record settings can be adjusted by a user.

5. The underwater digital video camera according to claim 1, wherein the digital storage holds one or more auto-record profiles being sets of auto record settings, which can be selected by a user.

6. A method, performed by an auto record system of an underwater digital video camera, for automatically starting and stopping video recording, the underwater digital video camera comprising a digital storage holding a sequence of recent current depths and auto record settings comprising a start trigger depth and a stop trigger depth, the method comprising the following to be performed repeatedly:
    if the video camera is not recording and if the current depth is increasing, determine whether the start trigger depth has been arrived at or passed;
        if the start trigger depth has not been arrived at or passed, then determine the current depth and add it to the sequence of recent currents depths;
        if the start trigger depth has been arrived at or passed, then start recording;
    if the video camera is not recording and if the current depth is decreasing, determine the current depth and add it to the sequence of recent currents depths;
    if the video camera is recording and if the current depth is decreasing, determine whether the stop trigger depth has been arrived at or passed;
        if the stop trigger depth has not been arrived at or passed, then determine the current depth and add it to the sequence of recent currents depths;
        if the stop trigger depth has been arrived at or passed, then stop recording; and
    if the video camera is recording and if the current depth is increasing, determine the current depth and add it to the sequence of recent current depths.

7. The method according to claim 6, wherein the auto record settings comprise a stop delay and wherein recording is stopped a time equal to the stop delay after the stop trigger depth is arrived at or passed for decreasing depths.

8. The method according to claim 6, wherein the auto record settings comprise a start delay and wherein recording is started a time equal to the start delay after the start trigger depth is arrived at or passed for increasing depths.

9. The method according to claim 6, further comprising determining whether the current depth is increasing or decreasing based at least in part on the sequence of recent current depths.

10. The method according to claim 6, wherein the underwater digital video camera is coupled to a human diver.

11. The underwater digital video camera according to claim 2, wherein the stop delay is adjustable by a user of the underwater digital video camera.

12. The underwater digital video camera according to claim 2, wherein the stop delay is a predetermined stop delay greater than or equal to an expected time for a diver to surface from the stop trigger depth.

13. The underwater digital video camera according to claim 1, wherein the auto record system determines whether the current depth is increasing or decreasing based at least in part on the sequence of recent current depths.

14. The underwater digital video camera according to claim 1, wherein the auto record settings in the digital storage further comprise:
    a start delay, wherein the auto record system is adapted to start video recording a time equal to the start delay after the start trigger depth is arrived at or passed for increasing depths; and
    a stop delay, wherein the auto record system is adapted to stop video recording a time equal to the stop delay after the stop trigger depth is arrived at or passed for decreasing depths.

* * * * *